Figure 8:
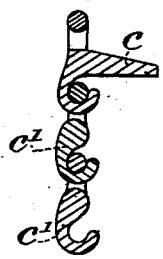

(No Model.) 5 Sheets—Sheet 1.
F. M. McLARTY.
APPARATUS FOR BORING EARTH, MINERALS, &c., FOR PROSPECTING PURPOSES.
No. 569,121. Patented Oct. 6, 1896.
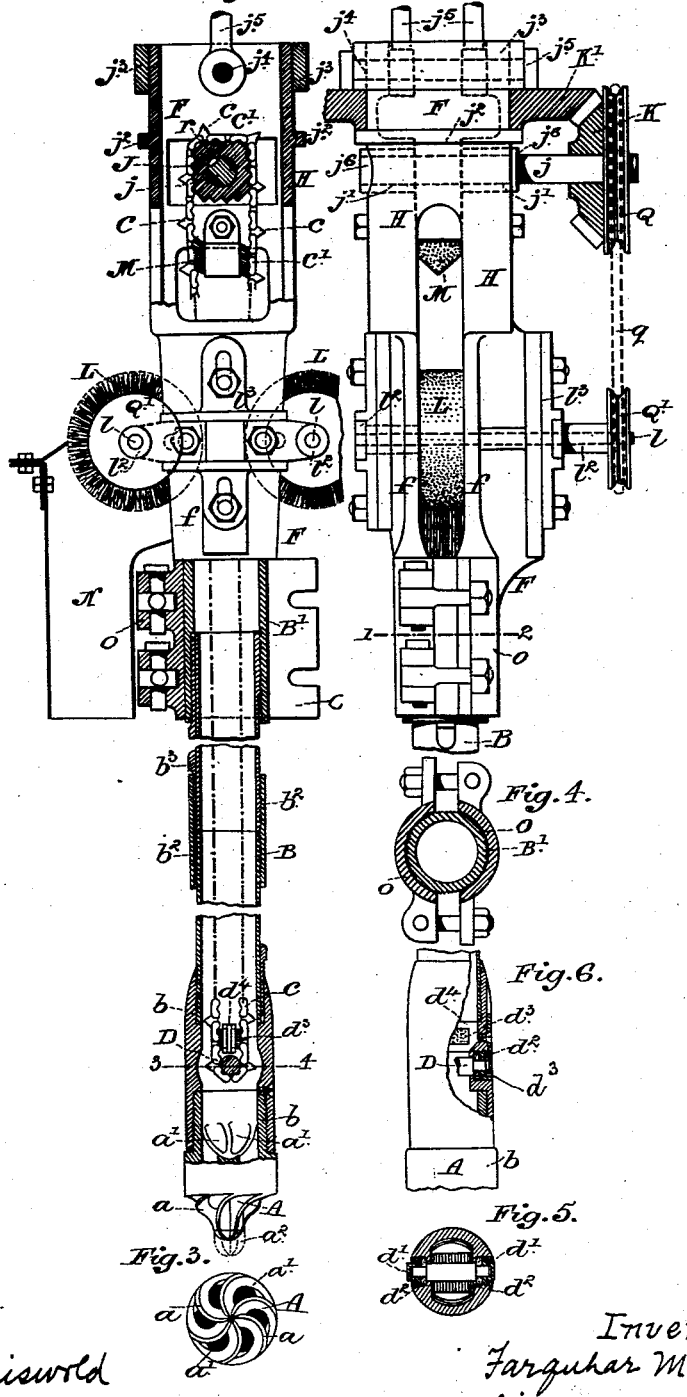
Witnesses:
Edith J. Griswold
S. C. Connor
Inventor:
Farquhar M. McLarty
By his attorneys
Howson and Howson (No Model.)  5 Sheets—Sheet 2.
F. M. McLARTY.
APPARATUS FOR BORING EARTH, MINERALS, &c., FOR PROSPECTING PURPOSES.
No. 569,121. Patented Oct. 6, 1896.
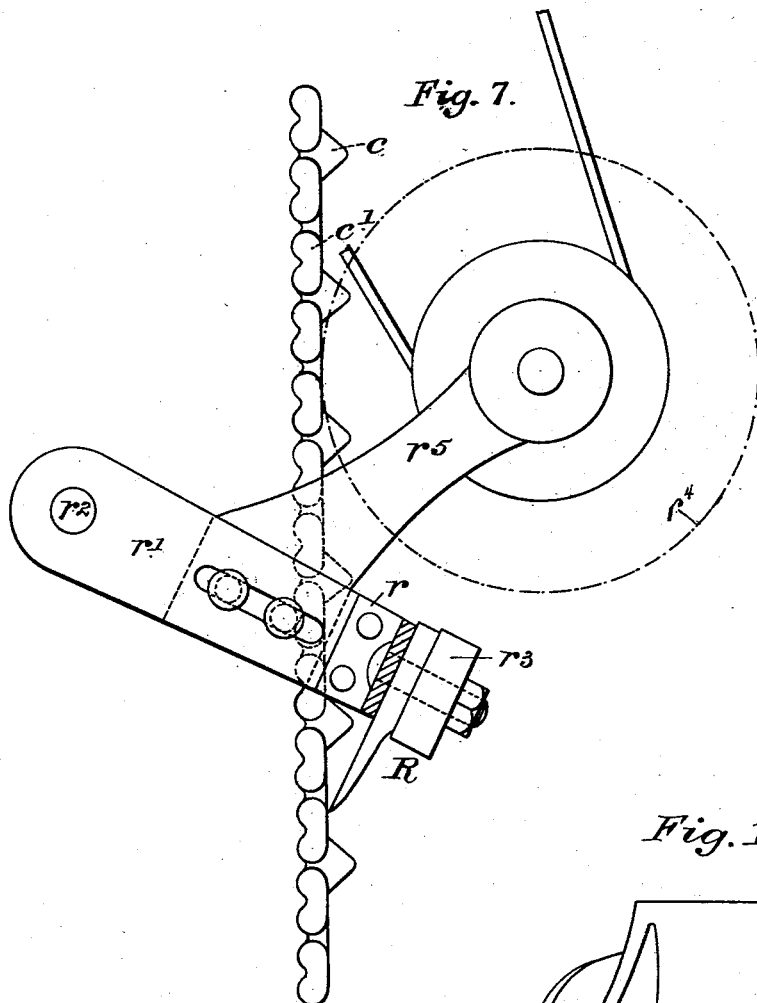
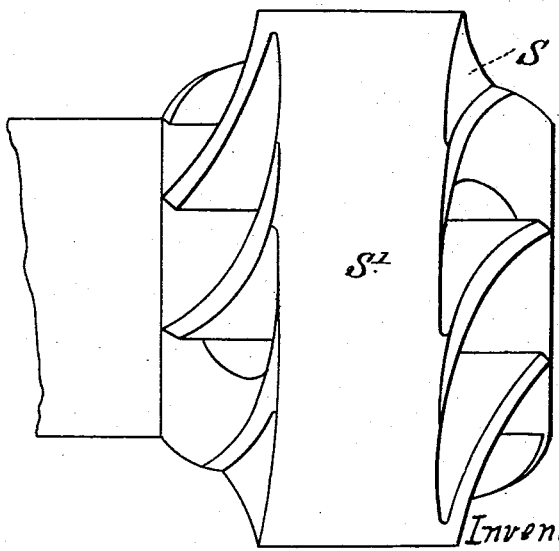

(No Model.) 5 Sheets—Sheet 3.

F. M. McLARTY.
APPARATUS FOR BORING EARTH, MINERALS, &c., FOR PROSPECTING PURPOSES.

No. 569,121. Patented Oct. 6, 1896.

Witnesses:
Edith J. Griswold
S. C. Connor

Inventor:
Farquhar M. McLarty
By his attorneys
Howson and Howson (No Model.) 5 Sheets—Sheet 4.
F. M. McLARTY.
APPARATUS FOR BORING EARTH, MINERALS, &c., FOR PROSPECTING PURPOSES.
No. 569,121. Patented Oct. 6, 1896.
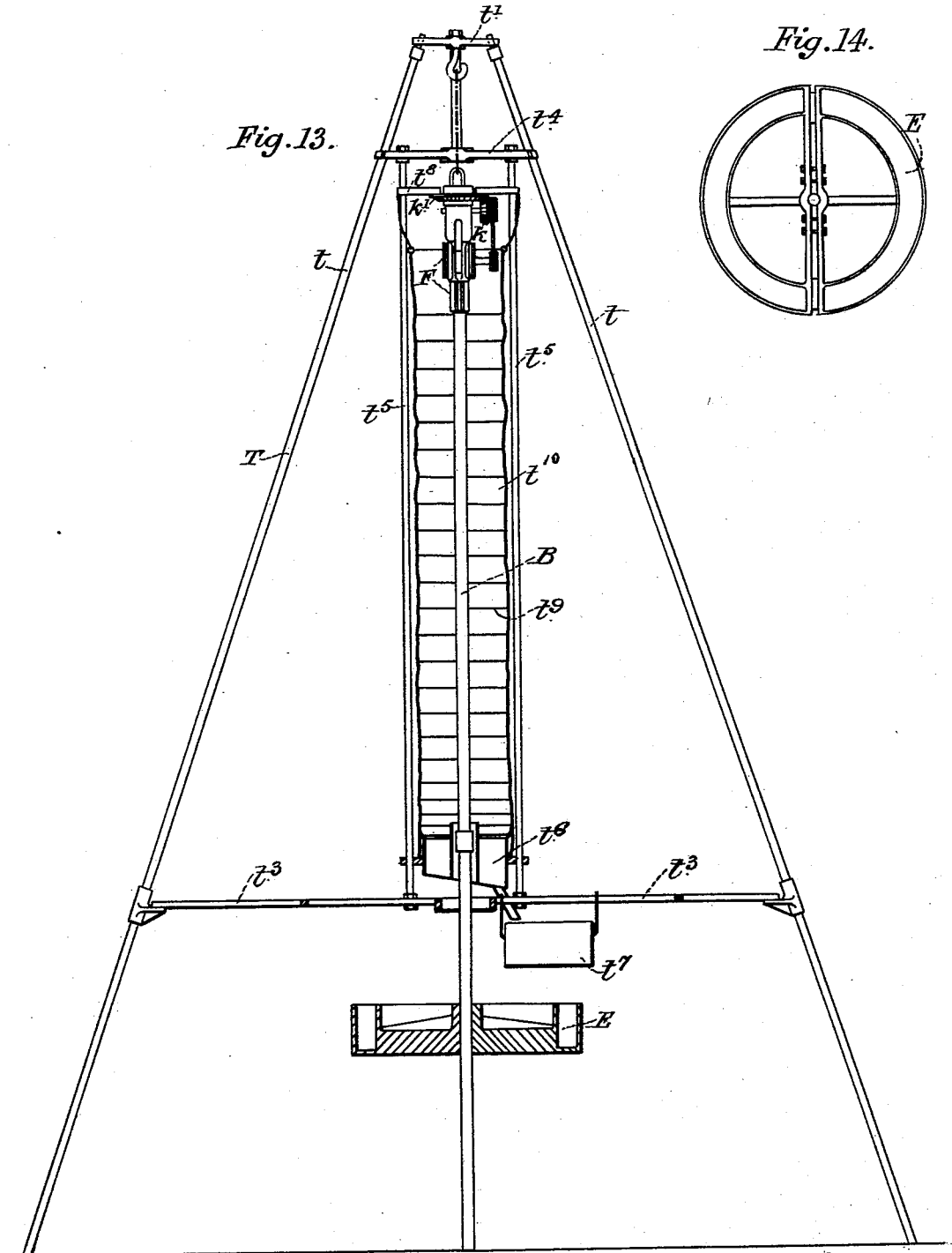
Witnesses:
Edith J. Griswold
S. C. Connor
Inventor:
Farquhar M. McLarty
By his attorneys
Howson and Howson (No Model.) 5 Sheets—Sheet 5.
F. M. McLARTY.
APPARATUS FOR BORING EARTH, MINERALS, &c., FOR PROSPECTING PURPOSES.
No. 569,121. Fig. 15. Patented Oct. 6, 1896.
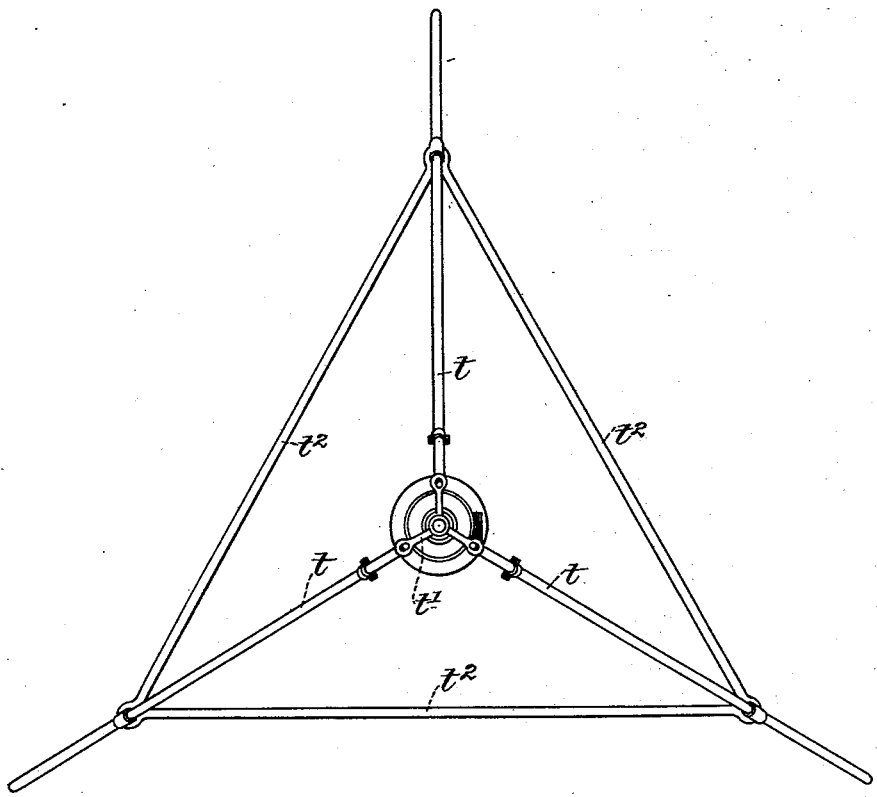
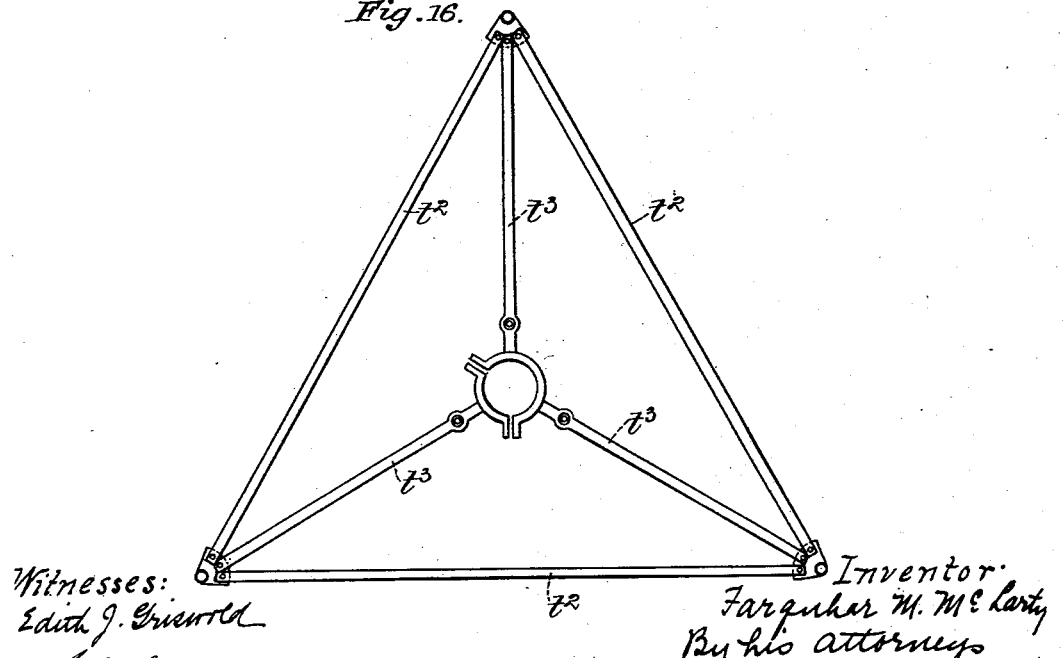

UNITED STATES PATENT OFFICE.

FARQUHAR M. McLARTY, OF PENANG, STRAITS SETTLEMENTS.

APPARATUS FOR BORING EARTH, MINERALS, &c., FOR PROSPECTING PURPOSES.

SPECIFICATION forming part of Letters Patent No. 569,121, dated October 6, 1896.

Application filed September 6, 1895. Serial No. 561,651. (No model.) Patented in England August 31, 1894, No. 16,604; in France August 28, 1895, No. 249,946; in Transvaal October 1, 1895, No. 980; in Western Australia October 15, 1895, No. 753, and in Spain December 26, 1895, No. 18,031.

*To all whom it may concern:*

Be it known that I, FARQUHAR MATHESON MCLARTY, mechanical engineer, a subject of the Queen of Great Britain and Ireland, residing at 30 Beach Street, Penang, Straits Settlements, but at present of 10 Euston Square, London, England, have invented certain Improvements in Apparatus for Boring Earth, Minerals, and the Like for Prospecting or other Purposes, applicable also for boring operations generally, (for which I have obtained Letters Patent in Great Britain, No. 16,604, dated August 31, 1894; in France, No. 249,946, dated August 28, 1895; in Western Australia, No. 753, dated October 15, 1895; in Transvaal, No. 980, dated October 1, 1895, and in Spain, No. 18,031, dated December 26, 1895,) of which the following is a specification.

The object of my invention is to provide apparatus for boring earth, minerals, and the like for prospecting or other purposes, the said apparatus enabling reliable indications to be obtained of the strata through which the borings are made and overcoming many of the objections which apply to boring apparatus as hitherto constructed and operated.

According to my invention I provide means for effecting the boring and for delivering the bored material to apparatus by means of which it is conveyed, as it is bored, to the surface, so that the borings are prevented from clogging the bore holes or tubes and so that at any time the character of the strata through which the boring is effected can be ascertained with certainty.

My invention can be applied to the making of small bore-holes for prospecting or ascertaining with certainty the nature of the strata through which the borings are made or for making larger holes, such, for instance, as shafts for mining purposes.

In order that my invention may be clearly understood, I will refer to the accompanying drawings, which illustrate, by way of example, an arrangement for boring small holes used for obtaining samples of the strata through which the bore-tool passes, or for other purposes, and to certain details of construction.

Figure 1 shows the apparatus in elevation. Fig. 2 is an elevation at right angles to Fig. 1, partly in section. Fig. 3 is a plan or under side view of the borer. Fig. 4 is a section through the lines 1 2, Fig. 2; Fig. 5, a section through the line 3 4, Fig. 1. Fig. 6 is a vertical section, at right angles to Fig. 1, of the lower part of the borer-tube. Fig. 7 shows the scraper and brush in elevation. Figs. 8, 9, 10, and 11 show three forms of elevator-chains. Fig. 12 is the boring-shoe; Fig. 14, the driver-wheel, and Figs. 15, 13, and 16 views of the tripod and boring apparatus attached thereto.

The apparatus consists principally of a boring head or tool A, constructed as hereinafter described and connected to tubing B, through which motion is given to the boring head or tool, and of an elevator C, working in the tubing, for delivering the bored material up to the surface, and of a driver E for imparting motion to the apparatus and to the elevator while it revolves with the tubing and boring head or tool.

The borer A is hollowed and may be conical or cylindrical within or without, or both, so that its sides are either taper or parallel, but having for most purposes the largest diameter at the end. The upper end is attached to the tubing so that it rotates with it, or, if the borer be made of tool-steel, it is convenient to employ a separate casting, as shown at *b* in Fig. 1 of the drawings, for carrying the elevator-pin hereinafter referred to.

The lower end of the borer consists of blades or curved cutters *a*, which also act as wedges. They may be made to any pitch consistent with the work to be done and may be tapered, semispherical, curved, or flat in respect to the lines of their leading edges, and these lines are to be understood as those which give shape to the bottom of the hole to be bored. The said blades force through openings *a'* between the blades to within the interior of the borer the material bored up to the diameter to which the said openings extend, while forcing outward and pressing into the surrounding strata or sides of the bore-hole the material which is outside the diameter to which the said openings extend. The object of this is to prevent anything from following the tool, such, for instance, as fine tin ore, and thus to insure the accurate indication by the material delivered by the elevator from within the borer and its attached tubing of the strata through which the borer passes.

A spike or jumper $a^2$ for breaking stones may be secured in the end of the borer, as shown by the dotted lines in Fig. 1, or may form a part thereof, and it may be grooved or spiral or of other suitable form. In cases where it is not wanted it may be taken out.

In the set of tools I may provide a borer with a hole where the jumper is to be inserted and also a borer in which the blades are joined at the center, each pair of which may be considered a jumper. This form of the tool is adapted for ground a part of which when broken can be compressed into the surrounding strata; but in the case of rock or similar hard substances the borer used need have no part of its wedges or blades for pressing the material into the strata and the openings can then extend to the outer diameter and the blades will be curved in the reverse direction to that used in the other case, while the direction of the rotation will be the same, so that the action of the blades will force all the borings toward the center. The borer may, however, be right or left handed, as desired, so that without changing the tool, but merely by reversing the direction of rotation, the two different kinds of boring can be done, the elevator and other gear being arranged to act both ways, as hereinafter described. Having passed from strata of which only samples are required to strata all of which borings are wanted, it is only necessary to reverse the motion and the borings will be forced from the circumference inward. In the latter case the blades act as jumpers when required.

When the borer is employed for working in earth, sand, or clay, or other material easily separated, it is preferably made of cast, malleable iron, or steel, but it may also be made of mild steel or cast-iron, in which case the angles of the holes for admitting the borings to the hollow of the borer may be sloped so as to take in the material with little or no load on the tubing.

The various forms of the borer described are for boring performed without any outer tube, the tubing used taking the place of the outer boring-rod and likewise of the ordinary tubes, so that there is a very great reduction in the friction, because, while the ordinary tube on its inner and outer surfaces is in frictional contact with the strata passed through and the auger has to contend with the friction of the portion of the strata within the tube, the borer described (the lower part being larger than the upper part and the tubing) entirely clears the way for the tubing and friction is reduced to a minimum.

For boring holes of great depth where a tube is required to remain in the hole, for instance, where the bore is for oil or water, then the outer tube used is at its lower end the same as at the outer part of the borer, as shown in Fig. 12, and just as that part must clear itself, so must the outer tube when fitted with a shoe $S'$ of similar form and so fixed as to form part of the tool or tubing, as may be preferred. The clearance is effected by a collar S just above the tool, which collar at its upper and its lower edges is shaped so as to press the strata against the side of the hole, whether on its downward or upward course.

When using an outer tube, the borer may rest against a notched collar within the shoe of the tube and may be withdrawn along with the apparatus, leaving the outer tube in the hole, or the whole (i. e., outer tube as well) may be drawn at once. For work where the borer may be required to go in advance of the tubing there will be no such collar employed. In either case the outer tubing may be worked independently or connected to the apparatus above.

The lower end of the borer carries a pin or runner D, around which the elevator C works, and is provided with two stuffing-boxes $d'$, packing, and glands $d^2$ in which the elevator-pin rotates. The packing on the inner sides and the closed glands on the outer sides entirely exclude grit or other external matter from the journals, and the spaces between the ends of the pin and the glands hold a lubricant, which may be oil, grease, or other antifrictional substance.

A brush $d^3$ is fixed in a frame $d^4$, of iron or other strong non-brittle material, which fits into the part $b$, carrying pin, and is held there by the lower end of the tubing. The object of the brush is to prevent anything (which might be let fall from above) from getting between the elevator and the pin. The brush may be of any moderately-flexible durable kind, but of those known I prefer a steel-wire brush.

The elevator consists of a chain having equally-pitched links of two kinds, one kind, $c$, acting as scoops and carrying up the borings, and the other kind, $c'$, serving to connect the scoops at any required distance apart. The chain passes around the pin D in the borer and over a tumbler J, keyed to a spindle $j$, which revolves within the cap-piece F above the ground-level, as hereinbefore described. The tumbler acts as a driving-pulley and the said chain C is carried around as the spindle revolves. The chain is constructed so that it occupies but small space, the dimensions being such as will allow one side thereof to pass down while the other is passing up within the tube B. All the links are readily attachable and can at any time be lengthened or shortened.

Figure 9:
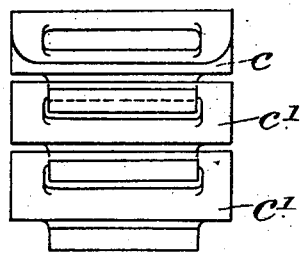
Figure 10:
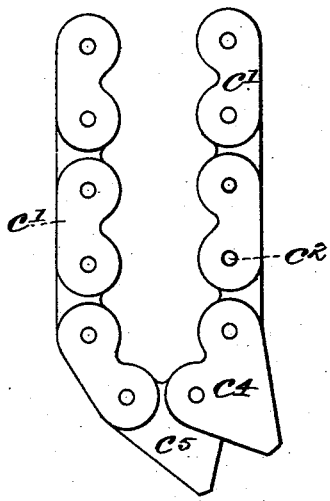
Figure 11:
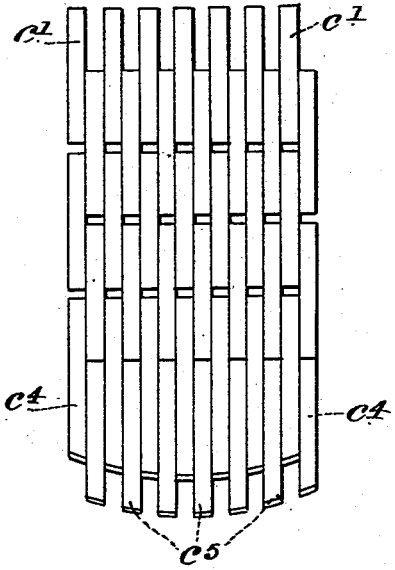

To insure against disconnection when at work, the bar of one link can slide into the hook or slot of the other link from the side, in the case of the elevator intended for light work, as shown in Figs. 8 and 9, while in the case of those for work where great strength is required relatively to bulk and weight Figs. 1, 10, and 11, I employ a series of links in place of the single link used for light work, and I connect them by movable pins $C^2$, the pin-holes in the outer links being countersunk and the pins laid in flush, so as to prevent them from moving sidewise, the taper of the holes being such, however, as to render it easy to drive the pins out when the link opposite to the point of the pin-drift is held in opposition to the applied force. The superior strength of the chains in which movable pins are used is due to the additional resistance to rupture offered by the pins when connected as described and shown.

In the case of the links being elongated, so that unnecessary openings would be left, projections are provided to prevent the passage of material inward between the links in course of delivery. The projection need not be in one piece with the link nor need it be of the same material, and where for lightness or other consideration it is preferred as an attachment it may be pinned or otherwise secured to the link, care being taken not to reduce the strength of the body of the link below that of its eyes. Both kinds of the scoop-links which have movable pins are at their back sides the same, but on their faces, i. e., on that side which takes the borings, they are distinctly different, the kind shown in Fig. 1 being each of one piece and therefore unchangeable in character, while the kind shown in Figs. 10 and 11 is formed of two sets of projecting parts $c^4$ and $c^5$, which open like a series of pairs of shears when entering the hollow of the borer, and on reaching the center of the hollow begin to close, but so that when they reach the tubing they act in the same way as a solid scoop, the one set filling the space not occupied by the other.

The elevator may be worked independently by a handle screwed into the tumbler-pinion, but when the apparatus is at work the elevator gets its motion as hereinafter described.

Another pinion, gearing into the tumbler-pinion, is passed over the guide-tube, (or when the guide arrangement is as shown in the drawings illustrating the tripod over the crown-piece,) which revolves within the former. This pinion may have two eyebolts, standing up vertically with their eyes on a line with each other horizontally. In these eyes (or in any other equivalent manner) a light tube is fixed, its one end projecting so as to lie against a leg of the tripod, or if the tripod is in use below that point, then against a bar rising from a leg of the tripod. In either case this tube attached to the top pinion is free to descend with it. When the driver is turned, it of course carries everything with it, except the tripod and parts connected thereto. As a consequence the tumbler-pinion is carried around with the cap-piece and, as that pinion gears into the upper pinion, which is stationary, the tumbler is set in motion and works continuously with the other parts of the apparatus. The speed of the elevator may be whatever is desired.

The greater in diameter the fixed pinion is in comparison to the tumbler-pinion the greater will be the speed of its spindle, and the larger the tumbler is circumferentially so will the speed of the latter be greater. There are thus two ways of increasing and (by the reverse operation) two ways of decreasing the speed of the elevator.

The driver may be of any form that will clamp on the tubing, but one of the most convenient forms will be a wheel E, Figs. 13 and 14, the rim of which may have grooves or V recesses for a driving-rope. The kind best suited for facilitating transport amounts practically to two wheels, one above the other, so made that when bolted to the tube they appear one wheel, the rim forming an annular box open at the top, into which earth or other matter may be placed as a load.

By tightening or slackening the securing-nuts the driver can be raised or lowered at will.

At points within the annular box spokes can be inserted into sockets, so that men can without walking around rotate the apparatus.

For work where it would be more convenient to do without a wheel for the driver, a simple pair of clamps with an arm on one end of each, but placed opposite to each other, will serve as the driver when bolted so as to grip the tubing, and there may of course be any number of arms that there is room for. For driving by hand-power direct, the clamp with arms only, or also with a rim fixed or detachable and thus forming a wheel, may be used, as preferred by the operator, but for driving by a mechanical motor the wheel is preferable. When intended to be used as an aid to transport, the driver is made so that it can be used as two separate wheels, into the centers of which an axle having a lever at right angles is fitted, thus forming a carriage which may be used for transport.

The cap-piece F is connected by a coupling B' to the driving-tubing B, to which it is keyed. From that point upward the cap-piece springs into webs $f$, tapering outward, leaving the elevator exposed on both sides. At their upper ends the webs are joined by a crown-piece H, into which a guide-tube is vertically screwed, or the guide-tube need have no screw, in which case it will be held by a pin or by a key or both. Such a guide-tube is not shown in the drawings, the form of guide which I prefer being that shown in Fig. 13, placed below the cap-piece, as hereinafter described with reference to the tripod.

Between the part $b$, carrying the pin D, and cap-piece there is simply the tubing B, with its couplings $b^2$ and keys $b^3$ and the elevator C within the couplings, and the ends of the tubing fitting into them being provided with threads or with part threads for rapidly connecting the parts together when desirable. The tubing may be of mild steel or any other metal or alloy that will meet the requirements for which the apparatus may be designed, and the tubes are preferably swollen at the ends, leaving the inside of the tubing smooth.

The cap-piece F is shown in the drawings as carrying the tumbler J, the spindle or shaft $j$, and the pinions K K' for imparting motion to the elevator C, the gear for working the revolving brushes L, and the arms for elevator-scraper, as shown in Fig. 7, when such is used in place of or in combination with a revolving brush or used in advance thereof. The cap-piece also carries the top stationary brush M, the chute N, and other parts hereinafter described. The cap-piece may be of cast, malleable iron, or steel, thoroughly annealed, or of any material suited to the requirements.

The lower end of the cap-piece F is constructed to clamp on, by means of clamps O, to the coupling B', which is screwed on and keyed to the upper length for the time being of the bore-tube B. This coupling is thicker than the couplings which have merely to hold the tubing together, since it is subjected to more wear and tear, and may be made of mild steel or wrought-iron, preferably with V-shaped grooves on its outer surface, as shown in Fig. 4, so as to make the grip of the cap-piece secure, the inside of the clamps O being slightly grooved to the same gage. The webs $f$ join the clamps O to the crown-piece H, the whole being either one casting or built together to constitute one part. In the crown-piece H brushes $j'$ are provided for the tumbler-spindle $j$. On the collar $j^2$, which is shown immediately above the spindle $j$, the stationary pinion K' rests, its inside being bored to fit the turned part of the crown-piece H, which works within it. The collar $j^3$, which may be of malleable iron or mild steel, serves to keep the said stationary pinion K' in position and is held by a bolt $j^4$, which in turn is held by a loose collar with a split pin, the same bolt serving also to hold the lifting-shackle $j^5$ for attachment to the tripod when required, as hereinafter described. The tumbler-spindle $j$ is held longitudinally by collars $j^6$. The pinion K for working the spindle may be keyed to it.

The tumbler J has a feather $r$ fixed in it, and the spindle has a keyway extending from one end, so that by placing the tumbler between the cheeks that hold it sidewise, driving the spindle through the bushes to the required point and fixing the loose collars of spindle, the connection is made. The sheave or pulley Q for driving the revolving brush is keyed to the tumbler-spindle $j$. It may be placed as shown in the drawings or on the opposite side from the tumbler-pinion, the driven sheave Q' being placed to suit the band $q$, running either direct or crossed, as may be required to brush off the borings in the required direction. In the drawings the sheaves are, however, shown on the same side as the tumbler-pinion.

The revolving brushes L L are keyed on spindles $l$, which revolve in adjustable bearings $l^2$, that are attached to adjustable brackets $l^3$, and the driven sheaves are keyed to the ends of the spindles. The revolving brushes being similar and adjustable, one brush will do for either side, but for rapidity of action there may be two brushes, as shown, the band being passed over the spindle of the one in action while boring in one direction and shifted to the other when the apparatus is reversed, (or only one brush may be used, which may be shifted as desired,) or the two can act together, brushing in the same or in opposite directions, as may be desirable for the particular work in hand.

Where both brushes are required to work simultaneously, two bands would be employed, driven by two of the grooves of the driving-cone. The adjustable bracket $l^3$ is for regulating the strain on the band, the adjustable bearings $l^2$ being provided to admit of regulating the grip of the circular brushes, so that, though the diameter may alter by wear, the brush can be used till it is worn out and may at any of its diameters be made to brush lightly or with any degree of force, as may be required in the different kinds of borings met with. As the circular brush removes the borings from the elevator they fall into the chute N and from there they drop into a receiving-tray, and thence into a receptacle suitable for examination or for packing into sections.

As an alternative method for removing the borings from the elevator working independently or in advance of the circular brush I may employ an automatically-working scraper R, as shown in Fig. 7, the scraper attached to a bar $r$, joining a pair of arms $r'$, working on pivots $r^2$, that are fixed in the cap-piece, the pivots being situated above the bar that connects the arm. When the scraper is in position against the elevator-chain, the scoop-links catch the scraper and raise it, so that the scraper moves outwardly as well as upwardly, and a horizontal scraping motion results until the scraper falls over the scoop-link of the elevator and lies against the connecting-links, which are then scraped by their vertical motion as the scraper bears against them until the next scoop-link reaches the scraper, when the horizontal scraping begins again, and so on.

When the scraper is not wanted to act, the arms may be lifted so as to hold the scraper outside of the range of contact. The particular degree of force applied to the scraper may be obtained either by a weight $r^3$, attached to the bar $r$ or to the scraper, or by adjustable springs bearing on the arms, or the weight may be on the arms.

Above the circular brush, but between the inner sides of the elevator, there is a stationary brush M for rendering these sides perfectly clean before they reach the tumbler J, the brush being secured with a bolt or in any other equivalent manner.

The tripod serves to guide, lift, or suspend the boring apparatus and may be of tubing or tight-laced bars of iron or steel or of any other light strong material. Its cap is shown above the tubing in the drawings. A suitable form of tripod is shown in Figs. 13, 15, and 16. The legs of the tripod are marked $t$, the cap $t'$, the side stays $t^2$, the central stays (forming also lower guide-frames) $t^3$, the top guide-frame $t^4$, the guides $t^5$, an annular tray $t^6$, the receiver-seat $t^7$, and the stationary pinion-holder $t^8$.

As the borings leave the elevator they are received by any suitable receptacle, for example, they may fall into a tapered mouthpiece or chute, and if the borings fall into a glass as the work proceeds the person in charge can see what is the nature of the strata being bored. He may remove one glass or receptacle, replacing it by another, and examine the borings when he pleases or pack them in sections for future inspection.

A convenient arrangement is as follows: An annular tray $t^6$, with a tubular cotton or other flexible chute $t^{10}$, with hoops $t^9$ of a little less diameter than the tray on its outer side, the canvas having its lower end attached a few inches above the entrance to the tray and its upper end a few inches below the chute before referred to, the upper end being hung from the stationary pinion-holder $t^8$. In that arrangement the borings can be seen at three points: first, as they fall from chute; next, as they fall into the tray, and again as they fall from the lowest point of the tray to the receiver, which may be placed on a seat which may be hung from the lower guide-frame. As the apparatus sinks, the flexible chute folds down above the outside of the tray and the ends of the chute will retain their positions relatively with the outlet of chute above and the outer part of the tray below. The receptacle for the borings, which may be called the "receiver," may be of any form or dimensions that may be desired, and may be made of transparent material or not, as preferred.

The details which I have described specially deal with apparatus as applied to prospecting purposes, and I do not limit myself to the precise details set forth, but it also serves to indicate the principles of the invention. The apparatus will bore any size hole, but in the case of large holes the blades of the borer need not be in one casting or forging, as hereinbefore described, but may be built together of parts, the cutting edges being preferably tool-steel, while the other parts may be castings.

For convenience of transport the apparatus may be taken in parts from one place to another and erected where it may be required. When in position and its several parts connected, a rotating motion is conveyed to the boring-tube through the driving wheel or clamp and the several working parts simultaneously get into motion, as hereinbefore described.

Where it is desired to lengthen or shorten the tubing and elevator while the apparatus is in position, the disconnection and reconnection may be in the following order: Taking, as an illustration, the case when the apparatus is placed to bore vertically, the suspending-shackle in crown-piece is placed into the lower hook of hoisting-tackle hung from the swivel-hook above and a light strain is applied. The two sides of the elevator are then gripped above the clamp of the cap-piece, so that below that point the elevator when disconnected will remain in its position. The bolts of the clamp are then slackened and the cap-piece, with the free part of elevator, are lowered. The latter is then disconnected and the cap-piece, with its connections, including the upper part of the elevator, are then hoisted clear, so that room is left for the connection of another length of tubing with elevator within. The latter is then connected at the lower points, previously disconnected, the lower end of the tube next, then the elevator above, while the clamps of the cap-piece are over the driving-coupling, but below the working position. Then the cap-piece is raised to take up the slackness of the elevator. The clamp-bolts are then screwed up, care being taken that they are in proper line, so that the elevator has no twist given to it. The boring may then proceed. The shortening of the apparatus is effected by the reverse operation, care being taken to suspend the lower tubing when it is not supported in the hole by a clamp above ground but below the point where the disconnection is desired.

Having now particularly described and ascertained the nature of my said invention and in what manner the same is to be performed, I declare that what I claim is—

1. A boring-machine having a perforated and hollow boring head or tool and tubing carrying the same, and means for rotating it, the said hollow head being provided at its lower end with blades curved from the circumference of the hollow head to the central axis, and leaving openings between them, the said blades being adapted to cut the material being bored and deliver the borings into the interior of the head between the blades when the apparatus is driven in the direction that wedges the borings toward the center, or in part thereinto and in part to press them into the surrounding strata when the apparatus is driven in the direction that wedges the borings away from the center, substantially as hereinbefore described.

2. A boring apparatus having a perforated and hollow boring head or tool, and tubing carrying the same and an elevator within the tubing, with means for working the elevator, the chain of the said elevator being constructed with closed links to prevent the escape of material through the chain, and the said chain carrying scoops which fill the space between the chain and the tubing, and formed so that the elevator when working in either direction takes up and elevates the whole of the material passed into the interior of the boring head or tool, substantially as hereinbefore described.

3. In apparatus for boring, tubing having an elevator therein with means for working the elevator, the scoops of the elevator constituting links in the chain, a pin and tumbler within the tube, around which the chain works, the scoops being formed with flat, or approximately flat, faces, the edges of which bear against the tube, so that the material being elevated, is confined between two adjacent scoops and the tube, and means for removing the material from the scoops before it reaches the said tumbler, substantially as hereinbefore described.

4. In apparatus for boring, the combination of a perforated and hollow boring head or tool, tubing, an elevator, provided with scoops presenting flat, or approximately flat, faces, means for working the elevator and a scraper, in combination with an adjustable revolving brush situated in proximity to the elevator-chain, before it passes over the upper pulley or tumbler so as to remove the material from the scoops before they pass around the said pulley, and while the borings are still within control, substantially as hereinbefore described.

5. A boring apparatus having a perforated and hollow rotary boring head or tool, and tubing carrying the same, with an endless elevator within the tubing, and carrying scoops which fit against the said tubing, and pulleys, tumblers, or pins, over which the endless elevator passes (the pulley, tumbler or pin below, being provided with means for the exclusion of grit and for retaining a lubricant as described) and means such as the brushes $d^3$ whereby material is prevented from clogging the moving parts, and gear for giving the requisite rotary motion to the tumbler from the rotation of the tubing and clearers whereby material is cleared from the said elevator, before it passes over the top pulley tumbler, or pin, and whereby delivery of the borings is secured, all substantially as hereinbefore described.

In testimony whereof I have signed my name to this specification in the presence of two subscribing witnesses.

F. M. McLARTY.

Witnesses:
WILLIAM F. UPTON,
CHAS. MILLS.